United States Patent
Fan

(10) Patent No.: US 9,191,242 B2
(45) Date of Patent: Nov. 17, 2015

(54) DIFFERENTIAL SIGNAL DETECTING DEVICE

(71) Applicant: IPGoal Microelectronics (Sichuan) Co., Ltd., Chengdu, Sichuan (CN)

(72) Inventor: Fangping Fan, Sichuan (CN)

(73) Assignee: IPGoal Microelectronics (Sichuan) Co., Ltd., Chengdu, Sichuan Province (CN)

( * ) Notice: Subject to any disclaimer, the term of this patent is extended or adjusted under 35 U.S.C. 154(b) by 11 days.

(21) Appl. No.: 14/070,560

(22) Filed: Nov. 3, 2013

(65) Prior Publication Data
US 2014/0126673 A1    May 8, 2014

(30) Foreign Application Priority Data
Nov. 7, 2012   (CN) .......................... 2012 1 0441811

(51) Int. Cl.
*H04L 25/06* (2006.01)
*H04L 25/02* (2006.01)

(52) U.S. Cl.
CPC ........ *H04L 25/0272* (2013.01); *H04L 25/0292* (2012.01)

(58) Field of Classification Search
CPC ............. H04B 10/6933; H04B 10/695; H04L 25/0272; H04L 25/0292
USPC .......................................... 375/318, 316, 340
See application file for complete search history.

(56) References Cited

U.S. PATENT DOCUMENTS

| | | | | |
|---|---|---|---|---|
| 6,232,842 | B1 * | 5/2001 | Asano ........................... | 330/308 |
| 6,587,004 | B2 * | 7/2003 | Ide ................................ | 330/308 |
| 7,643,583 | B1 * | 1/2010 | Savoj et al. ................... | 375/340 |
| 7,952,427 | B2 * | 5/2011 | Nagahori ....................... | 330/69 |
| 8,144,813 | B2 * | 3/2012 | Nakamura et al. ............ | 375/318 |

* cited by examiner

*Primary Examiner* — Leon Flores

(57) ABSTRACT

A differential signal detecting device includes a secondary amplifier; a front-end receiver and a final amplifier which are respectively connected to the secondary amplifier; and a signal outputter which is connected to the final amplifier. The front-end receiver receives two externally inputted channels of differential signals and an externally inputted reference threshold voltage, differentiates and transduces the two channels of differential signals. The secondary amplifier receives and amplifies the signals which are outputted by the front-end receiver, and outputs the signals amplified again. The final amplifier differentiates and amplifies the signals outputted by the secondary amplifier and outputs the two channels of differentiated signals. The signal outputter receives the two channels of differentiated signals which are outputted by the final amplifier and processes the two channels of differentiated signals with a logical conjunction before outputting.

9 Claims, 2 Drawing Sheets

DIFFERENTIAL SIGNAL DETECTING DEVICE

BACKGROUND OF THE PRESENT INVENTION

1. Field of Invention

The present invention relates to a field of signal detection, and more particularly to a differential signal detecting device.

2. Description of Related Arts

The differential signal detecting devices are for detecting the differential signals. As is known to the ones skilled in the art, the physically connected devices of the differential signal detecting device may introduce the noises, which is inimical to the signal receivers. Usually, in order to filter the noises, it is necessary to process the differential signals with a threshold detection, i.e., only the differential signals whose amplitudes surpass the preset threshold value are recognized as valid and then normally received; the differential signals whose amplitudes is lower than the preset threshold value are recognized as invalid and then rejected by the receiver.

According to the prior arts, the differential signal detecting device is unable to highly precisely detect the amplitude of the high-speed differential signals whose frequencies are over gigahertz and thus is unable to satisfy the requirements of the high precision and the high speed simultaneously. It is quite common to sacrifice the detection precision to satisfy the requirement of the high speed.

Thus it is necessary to provide a differential signal detecting device which overcomes the above disadvantages.

SUMMARY OF THE PRESENT INVENTION

An object of the present invention is to provide a differential signal detecting device for precisely detecting amplitudes of high-speed differential signals and changing a detection threshold of the high-speed differential signals by changing a reference threshold voltage, which is greatly flexible.

Accordingly, in order to accomplish the above objects, the present invention provides a differential signal detecting device comprising a secondary amplifier; a front-end receiver and a final amplifier which are respectively connected to the secondary amplifier; and a signal outputter which is connected to the final amplifier. The front-end receiver is a receiver having a high bandwidth and a low gain for receiving two externally inputted channels of differential signals and an externally inputted reference threshold voltage. The front-end receiver simultaneously amplifies the externally inputted two channels of differential signals and the externally inputted reference threshold voltage and outputs the amplified two channels of differential signals and the amplified reference threshold voltage after differentiating and transducing the externally inputted two channels of differential signals. The secondary amplifier is an amplifier having a high bandwidth and an intermediate gain; the secondary amplifier receives and amplifies the reference threshold voltage and the two channels of differential signals which are outputted by the front-end receiver and then outputs the two channels of differential signals and the reference threshold voltage which are amplified again. The final amplifier is an amplifier having a low bandwidth and a high gain; the final amplifier respectively differentiates and amplifies the reference threshold voltage which is outputted by the secondary amplifier and the two channels of differential signals which are outputted by the secondary amplifier, and then the final amplifier outputs the two channels of differentiated signals. The signal outputter receives the two channels of differentiated signals which are outputted by the final amplifier, logically combines the two channels of differentiated signals and outputs desired signals.

Preferably, the front-end receiver has three output ports for respectively outputting the two channels of differential signal and the reference threshold voltage which are amplified by the front-end receiver.

Preferably, the secondary amplifier comprises a first secondary amplifier and a second secondary amplifier, wherein both the first secondary amplifier and the second secondary amplifier have two input terminals and two output terminals.

Preferably, the two input terminals of the first secondary amplifier are respectively connected to the two output ports of the front-end receiver and the two output terminals of the first secondary amplifier are connected to the final amplifier; the first secondary amplifier receives a first channel of differential signal and the reference threshold voltage which are outputted by the front-end receiver and simultaneously amplifies the received first channel of differential signal and the received reference threshold voltage; then the amplified first channel of differential signal and the amplified reference threshold voltage are outputted via the two output terminals of the first secondary amplifier into the final amplifier.

Preferably, the two input terminals of the second secondary amplifier are respectively connected to the two output ports of the front-end receiver, and the two output terminals of the second secondary amplifier are connected to the final amplifier; the second secondary amplifier receives a second channel of differential signal and the reference threshold voltage which are outputted by the front-end receiver, and simultaneously amplifies the received second channel of differential signal and the received reference threshold voltage; the amplified second channel of differential signal and the amplified reference threshold voltage are outputted via the two output terminals of the second secondary amplifier into the second final amplifier.

Preferably, the first secondary amplifier comprises a first stage-one amplifier and a first stage-two amplifier, wherein both the first stage-one amplifier and the first stage-two amplifier have two input terminals and two output terminals. The two input terminals of the first stage-one amplifier are connected to the two output ports of the front-end receiver; the two output terminals of the first stage-one amplifier are connected to the two input terminals of the first stage-two amplifier; and the two output terminals of the first stage-two amplifier are connected to the final amplifier. The first stage-one amplifier and the first stage-two amplifier successively amplify the first channel of differential signal and the reference threshold voltage which are outputted by the front-end receiver at two stages.

Preferably, the second secondary amplifier comprises a second stage-one amplifier and a second stage-two amplifier, wherein both the second stage-one amplifier and the second stage-two amplifier have two input terminals and two output terminals. The two input terminals of the second stage-one amplifier are connected to the two output ports of the front-end receiver; the two output terminals of the second stage-one amplifier are connected to the two input terminals of the second stage-two amplifier; and the two output terminals of the second stage-two amplifier are connected to the final amplifier. The second stage-one amplifier and the second stage-two amplifier successively amplify the second channel of differential signal and the reference threshold voltage which are outputted by the front-end receiver at two stages.

Preferably, the final amplifier comprises a first final amplifier and a second final amplifier, wherein both the first final amplifier and the second final amplifier have two input terminals and an output terminal. The two input terminals of the first final amplifier are connected to the two output terminals of the first secondary amplifier; the output terminal of the first final amplifier is connected to the signal outputter. The first final amplifier receives the differential signals and the reference threshold voltage which are outputted by the first secondary amplifier, differentiates and amplifies the received differential signals and the received reference threshold voltage and then outputs the first channel of differential signal. The two input terminals of the second final amplifier are connected to the two output terminals of the second secondary amplifier; the output terminal of the second final amplifier is connected to the signal outputter. The second final amplifier receives the differential signals and the reference threshold voltage which are outputted by the second secondary amplifier, differentiates and amplifies the received differential signals and the received reference threshold voltage and then outputs the second channel of differential signal.

Preferably, the signal outputter is an AND gate circuit or an OR gate circuit, wherein two input terminals of the AND gate circuit or the OR gate circuit are respectively connected to the output terminal of the first final amplifier and the output terminal of the second final amplifier.

Compared with prior arts, because the differential signal detecting device of the present invention comprises the front-end receiver having a high bandwidth and a low gain, the secondary amplifier having a high bandwidth and an intermediate gain and the final amplifier having a low bandwidth and a high gain, the differential signal detecting device is able to efficiently receive high-speed differential signals without attenuation and output the received high-speed differential signals after differentiating and amplifying while amplifying the inputted reference threshold voltage, which amplifies an amplitude difference between the high-speed differential signals and the reference threshold voltage by same proportion in such a manner that the differential signal detecting device is able to precisely detect the amplitude difference between the high-speed differential signals and the reference threshold voltage and thus obtains an improved detection precision of the amplitudes of the high-speed differential signals. Meanwhile, the differential signal detecting device is able to change a detection threshold of the high-speed differential signals by changing the reference threshold voltage and thus obtains an improved flexibility of detecting the high-speed differential signals.

These and other objectives, features, and advantages of the present invention will become apparent from the following detailed description, the accompanying drawings, and the appended claims.

DETAILED DESCRIPTION OF THE PREFERRED EMBODIMENT

Figure 1:
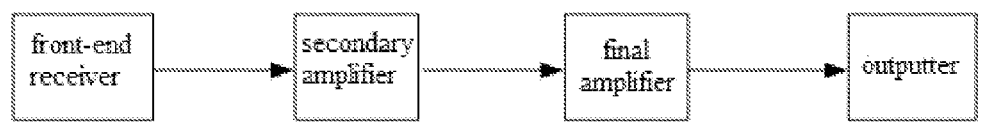
FIG. 1 is a block diagram of a differential signal detecting device according to a preferred embodiment of the present invention.

Combined with the drawings, the preferred embodiment of the present invention is illustrated as follows, wherein identical reference numbers of elements represent identical elements in the drawings. As described above, the present invention provides a differential signal detecting device which is able to precisely detect amplitudes of high-speed differential signals and change a detection threshold of the high-speed differential signals by changing a reference threshold voltage and thus obtains a great flexibility.

FIG. 1 shows a block diagram of the signal detecting device. Referring to FIG. 1 of the drawings, according to a preferred embodiment of the present invention, the signal detecting device comprises a front-end receiver, a secondary amplifier, a final amplifier and a signal outputter. The front-end receiver is a receiver having a high bandwidth and a low gain for simultaneously receiving two channels of differential signals and a reference threshold voltage which are externally inputted; the two channels of differential signals which are received by the front-end receiver are high-speed differential signals, i.e., the two channels of differential signal have a frequency over gigahertz. The front-end receiver simultaneously amplifies the two channels of differential signals and the reference threshold voltage and outputs the two channels of differential signals and the reference threshold voltage after differentiating and transducing. The secondary amplifier is an amplifier having a high bandwidth and an intermediate gain; the secondary amplifier receives and amplifies the reference threshold voltage and the two channels of differential signals which are outputted by the front-end receiver and outputs the two channels of differential signals and the reference threshold voltage which are amplified again. The final amplifier is an amplifier having a low bandwidth and a high gain; the final amplifier respectively differentiates and amplifies the reference threshold voltage which is outputted by the secondary amplifier and the two channels of differential signals which are outputted by the secondary amplifier, and then the final amplifier outputs the two channels of differentiated signals, in such a manner that the final amplifier compares an amplitude of the differential signals with the reference threshold voltage. When the amplitude of the differential signals is lower than the reference threshold voltage, the final outputter outputs a constant high level or a constant low level; when the amplitude of the differential signals is higher than the reference threshold voltage, the final outputter outputs the differential signals, so as to accomplish an amplitude detection and a selective output of the inputted high-speed differential signals. The signal outputter receives the two channels of differentiated signals which are outputted by the final amplifier, logically combines the two channels of differentiated signals and then outputs desired signals.

Figure 2:
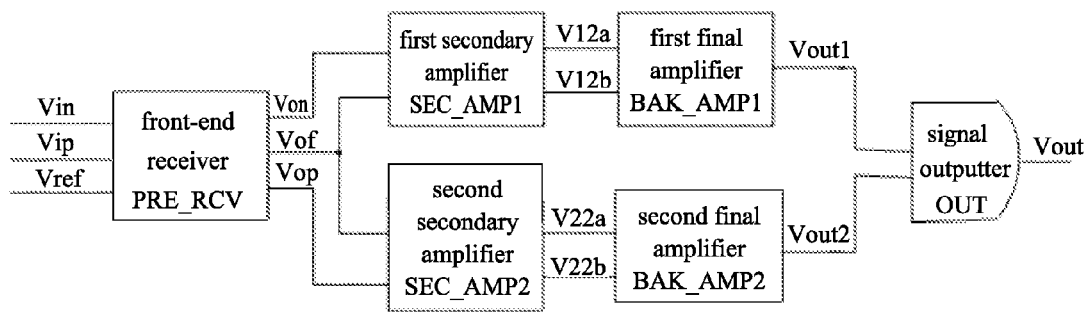
FIG. 2 is a sketch view of a circuit of the differential signal detecting device according to the preferred embodiment of the present invention.

FIG. 2 shows a sketch view of a circuit of the differential signal detecting device. Further referring to FIG. 2, the front-end receiver PRE_RCV has three receiving ports and three output ports. Because the front-end receiver PRE_RCV is a receiver having a high bandwidth and a low gain, the externally inputted high-speed differential signals Vin and Vip and the externally inputted reference threshold voltage Vref are respectively inputted into the front-end receiver PRE_RCV via the three receiving ports of the front-end receiver PRE_RCV without attenuation; the front-end receiver PRE_RCV differentiates and amplifies the inputted high-speed differential signals Vin and Vip. Specifically, the front-end receiver PRE_RCV differentiates and amplifies the high-speed differential signals Vin and Vip and then outputs differentiated Von and Vop, wherein Von=A1(Vin−Vip); Vop=A1(Vip−Vin); A1 is a DC (direct current) gain; in other words, the front-end receiver PRE_RCV detects the differential amplitude of the high-speed differential signals Vin and Vip; correspondingly, the reference threshold voltage Vref runs through identical paths in the front-end receiver PRE_RCV to the high-speed differential signals Vin and Vip, which means that the reference threshold voltage Vref is amplified by same proportion to the signals Vin−Vip and Vip−Vin, i.e., the outputted reference threshold voltage Vof=A1*Vref. The signals Von, Vop and Vof are respectively outputted via the three output ports of the front-end receiver PRE_RCV into the secondary amplifier.

The secondary amplifier comprises a first secondary amplifier SEC_APM1 and a second secondary amplifier SEC_APM2. The first secondary amplifier SEC_APM1 is an amplifier having a high bandwidth and an intermediate gain for efficiently receiving the high-speed differential signals and amplifying the high-speed differential signals. The first secondary amplifier SEC_APM1 has two input terminals and two output terminals, wherein the two input terminals of the first secondary amplifier are respectively connected to the two output ports of the front-end receiver PRE_RCV, for receiving the signals Von and Vof which are outputted by the front-end receiver PRE_RCV; the two output terminals of the first secondary amplifier are respectively connected to the final amplifier. The first secondary amplifier SEC_APM1 amplifies the received signals Von and Vof and outputs the amplified signals V12$a$ and V12$b$ via the two output terminals of the first secondary amplifier, wherein V12$a$=A2*Von; V12$b$=A2*Vof; A2 is a DC gain of the first secondary amplifier SEC_APM1, in such a manner that the first secondary amplifier SEC_APM1 by same proportion amplifies the signals Von and Vof. According to the preferred embodiment of the present invention, the first secondary amplifier SEC_APM1 and the second secondary amplifier SEC_APM2 have identical structures and functions and thus, herein, a detailed description about the structure and the function of the second secondary amplifier SEC_APM2 is omitted without repeating again. The signals Vop and Vof are outputted into the two input terminals of the second secondary amplifier SEC_APM2 which amplifies the signals Vop and Vof and then outputs V22$a$ and V22$b$ via the two output terminals of the second secondary amplifier SEC_APM2, wherein V22$a$=A2*Vop; V22$b$=A2*Vof.

The final amplifier comprises a first final amplifier BAK_APM1 and a second final amplifier BAK_APM2. The first final amplifier BAK_APM1 is an amplifier having a low bandwidth and a high gain, for efficiently receiving the high-speed differential signals and amplifying the high-speed differential signals. The first final amplifier BAK_APM1 has two input terminals and an output terminal, wherein the two input terminals of the first final amplifier are respectively connected to the two output terminals of the first secondary amplifier SEC_APM1, for receiving the signals V12$a$ and V12$b$; the output terminal is connected to the signal outputter OUT. The first final amplifier BAK_AMP1 differentiates and amplifies the received signals V12$a$ and V12$b$ and outputs the signal Vout1 via the output terminal, wherein Vout1=A3(V12$b$−V12$a$); A3 is a DC gain of the first final amplifier BAK_AMP1. The signal Vout1 is outputted via the externally inputted high-speed differential signals Vin and Vip and the externally inputted reference threshold voltage Vref after multiple amplifications and transductions and an amplitude of the signal Vout1 is far larger than those of the signals Vin and Vip, in such a manner that it is easier to detect the signal Vout1 than the signals Vin and Vip; in other words, the differential signal detecting device is able to precisely detect out the differential amplitude between the high-speed differential signals and accomplish a highly precise detection of the amplitudes of the high-speed differential signals. Specifically, when V12$b$−V12$a$>0, the amplitudes of the high-speed differential signals Vin and Vip are larger than the standard threshold voltage Vref, i.e., the inputted high-speed differential signals Vin and Vip are valid signals, when the Vout1 exhibits a normal signal output; when V12$b$−V12$a$≤0, the amplitudes of the high-speed differential signals Vin and Vip are smaller than the standard threshold voltage Vref, i.e., the inputted high-speed differential signals Vin and Vip are invalid signals, when the Vout1 exhibits a constant high level or a constant low level. According to the preferred embodiment of the present invention, the first final amplifier BAK_AMP1 and the second final amplifier BAK_APM2 have identical structures and functions and thus, herein, the structure and the function of the second final amplifier BAK_AMP2 is omitted without repeating again. The two input terminals of the second final amplifier BAK_AMP2 receive the signals V22$a$ and V22$b$, differentiate and amplify the two signals V22$a$ and V22$b$ and output a signal Vout2 via the output terminal, wherein Vout2=A3(V22$b$−V22$a$). When V22$b$−V22$a$>0, the inputted high-speed differential signals Vin and Vip are valid signals and the Vout2 exhibits a normal signal output; when V22$b$−V22$a$≤0, the inputted high-speed differential signals Vin and Vip are invalid signals and the Vout2 exhibits a constant high level or a constant low level. In the above process, the two channels of differential signals which are amplified and outputted by the secondary amplifier are respectively processed with differential amplification with the reference threshold voltage and then outputted by the final amplifier, for detecting whether the amplitudes of the two channels of differential signals V12$a$ and V22$a$, compared with the reference threshold voltage V12B or V22$b$, are satisfactory, i.e., for detecting whether the externally inputted two channels of high-speed differential signals Vin and Vip are valid or not. When the amplitudes of the two channels of differential signals V12$a$ and V22$a$ are unsatisfactory, the final amplifier outputs no correspondent differential signals; oppositely, when the amplitudes of the two channels of differential signals V12$a$ and V22$a$ are satisfactory, the final amplifier normally outputs differential signals, in such a manner that the final amplifier detects the amplitudes of the inputted differential signals, controls the outputting of differential signals according to detection results and only outputs the valid differential signals, so as to accomplish a highly precise detection of the externally inputted high-speed differential signals.

The signal outputter OUT has two input terminals and an output terminal. The two input terminals of the signal outputter OUT are respectively connected to the output terminal of the first final amplifier BAK_APM1 and the output terminal of the second final amplifier BAK_APM2, for receiving the two channels of differential signals which are outputted by the final amplifier and combining the two channels of differential signals to output desired signals which are the differential signals whose amplitudes satisfy design requirements compared to the reference threshold voltage. The signal outputter OUT is an AND gate circuit or an OR gate circuit; a specific logic circuit of the signal outputter OUT is determined according to characteristics of the signals outputted by the final amplifier. For example, when V12$b$−V12$a$≤0 or V22$b$−V22$a$≤0, the Vout1 or the Vout2 exhibits a constant low level and thus the signal outputter OUT is the OR gate circuit; in contrast, when V12$b$−V12$a$≤0 or V22$b$−V22$a$≤0, the Vout1 or the Vout2 exhibits a constant high level and thus the signal outputter OUT is the AND gate circuit.

Figure 3:
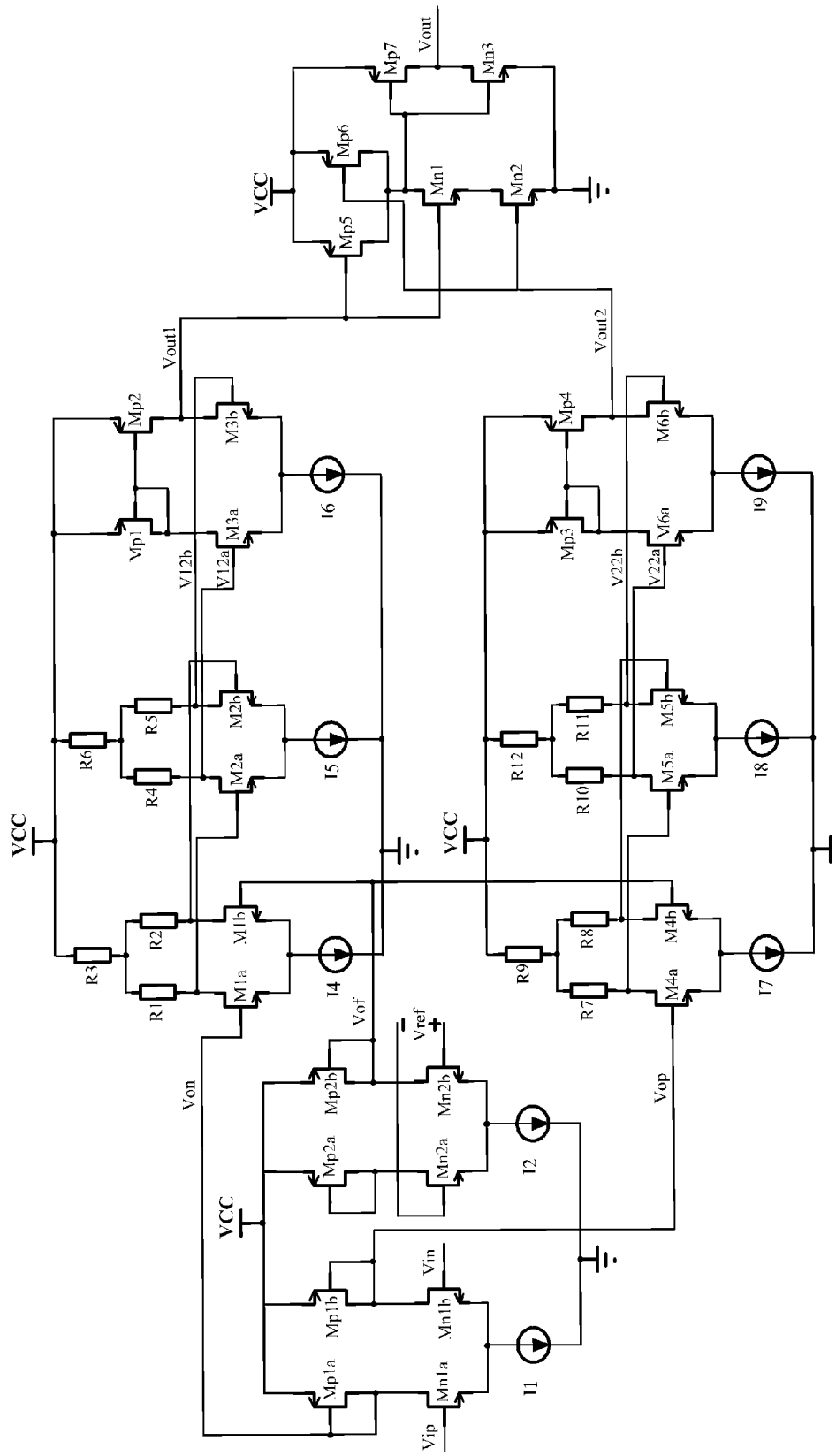
FIG. 3 is a circuit diagram of the differential signal detecting device according to the preferred embodiment of the present invention.

FIG. 3 shows a circuit diagram of the signal detecting device. Further referring to FIG. 3, the front-end receiver PRE_RCV comprises a first field effect transistor (FET) Mn1$a$, a second FET Mn1$b$, a third FET Mn2$a$, a fourth FET Mn2*b*, a fifth FET Mp1*a*, a sixth FET Mp1*b*, a seventh FET Mp2*a*, an eighth FET Mp2*b*, a first current source I1 and a second current source I2. The high-speed differential signal Vin is inputted via a gate electrode of the first FET Mn1*a* into the front-end receiver PRE_RCV and the high-speed differential signal Vip is inputted via a gate electrode of the second FET Mn1*b* into the front-end receiver PRE_RCV; the reference threshold voltage Vref is inputted via a gate electrode of the third FET Mn2*a* and a gate electrode of the fourth FET Mn2*b*; the differential signal Von is outputted via a gate electrode and a drain electrode of the fifth FET Mp1*a*; the differential signal Vop is outputted via a gate electrode and a drain electrode of the sixth FET Mp1*b*; and the reference threshold voltage Vof is outputted via a gate electrode and a drain electrode of the eighth FET Mp2*b*. The first secondary amplifier SEC_APM1 comprises a first stage-one amplifier and a first stage-two amplifier. The first stage-one amplifier comprises a first resistor R1, a second resistor R2, a third resistor R3, a ninth FET M1*a*, a tenth FET M1*b* and a fourth current source I4. The differential signal Von is inputted via a gate electrode of the ninth FET M1*a*; the reference threshold voltage Vof is inputted via a gate electrode of the tenth FET M1*b*, in such a manner that the first stage-one amplifier amplifies the signals Von and Vof at one stage and outputs the amplified signals into the first stage-two amplifier. The first stage-two amplifier comprises a fourth resistor R4, a fifth resistor R5, a sixth resistor R6, an eleventh FET M2*a*, a twelfth FET M2*b* and a fifth current source I5. The first stage-two amplifier has identical structure and function to the first stage-one amplifier. The differential signal V12*a* is outputted via a drain electrode of the eleventh FET M2*a* and then amplified by the first stage-two amplifier; the reference threshold voltage V12*b* is outputted via a drain electrode of the twelfth FET M2*b* and then amplified by the first stage-two amplifier; and the signals V12*b* and V12*a* are respectively inputted into the final amplifier, in such a manner that a first channel of differential signal Von and the reference threshold voltage Vof which are received, differentiated, amplified and then outputted by the front-end receiver PRE_RCV are amplified at two stages by the first secondary amplifier SEC_APM1 and then the first secondary amplifier SEC_APM1 outputs the differential signal V12*a* and the reference threshold voltage V12*b*. According to the preferred embodiment of the present invention, the second secondary amplifier SEC_APM2 has identical structure and function to the first secondary amplifier SEC_APM1 and thus, herein, a detailed description about the second secondary amplifier SEC_APM2 is omitted without repeating again. The second secondary amplifier SEC_APM2 comprises a second stage-one amplifier and a second stage-two amplifier. The second stage-one amplifier SEC_APM2 comprises a seventh resistor R7, an eighth resistor R8, a ninth resistor R9, a thirteenth FET M4*a*, a fourteenth FET M4*b* and a seventh current source I7. The second secondary amplifier comprises a tenth resistor R10, an eleventh resistor R11, a twelfth resistor R12, a fifteenth FET M5*a*, a sixteenth FET M5*b* and an eighth current source I8. The second secondary amplifier SEC_APM2 is for amplifying the signals Vop and Vof at two stages and outputting the amplified differential signal V22*a* and the amplified reference threshold voltage V22*b*. The final amplifier comprises a first final amplifier BAK_AMP1 and a second final amplifier BAK_APM2. The first final amplifier BAK_APM1 comprises a seventeenth FET M3*a*, an eighteenth FET M3*b*, a nineteenth FET Mp1, a twentieth FET Mp2 and a sixth current source I6. The differential signal V12*a* is inputted via a gate electrode of the seventeenth FET M3*a* into the first final amplifier BAK_AMP1; the reference threshold voltage V12*b* is inputted via a gate electrode of the eighteenth FET M3*b* into the first final amplifier BAK_AMP1. The first final amplifier BAK_APM1 differentiates and amplifies the signals V12*b* and V12*a* and outputs the differentiated and amplified signal Vout1, wherein Vout1=A3(V12*b*−V12*a*). An amount of the signal Vout1 represents a relationship between the differential amplitude of the differential signals Vin and Vip and the reference threshold voltage Vref. When V12*b*−V12*a*≤0, the inputted differential signals Vin and Vip are invalid signals and the Vout1 exhibits a constant high level without signal; when V12*b*−V12*a*>0, the inputted differential signals Vin and Vip are valid differential signals and the Vout1 exhibits a normal signal output. The first final amplifier BAK_AMP1 has identical structure and function to the second final amplifier BAK_AMP2. The second final amplifier BAK_AMP2 comprises a twenty-first FET M6*a*, a twenty-second FET M6*b*, a twenty-third FET Mp3, a twenty-fourth FET Mp4 and a ninth current source I9. The second final amplifier BAK_APM2 differentiates and amplifies the inputted differential signal V22*a* and the reference threshold voltage V22*b* and outputs the differentiated and amplified signal Vout2, wherein the Vout2 exhibits identically to the Vout1, without repeating again. When V12*b*−V12*a*≤0 or V22*b*−V22*a*≤0, the signals Vout1 and Vout2 accordingly exhibit a high level; thus, according to the preferred embodiment of the present invention, the signal outputter OUT is an AND gate circuit and the AND gate circuit comprises a twenty-fifth FET Mn1, a twenty-sixth FET Mn2, a twenty-seventh FET Mn3, a twenty-eighth FET Mp5, a twenty-ninth FET Mp6 and a thirtieth FET Mp7. The AND gate circuit processes the signals Vout1 and Vout2 with a logical conjunction, and finally outputs a signal Vout. Each element of the differential signal detecting device is connected as showed in FIG. 3, without repeating again.

Referring to FIGS. 1~3, the signal detecting device of the present invention has following working principles.

In the front-end receiver PRE_RCV, the DC gain A1=gmn/gmp, wherein gmn=gmn1=gmn1*b*=gmn2*a*=gmn2*b*; gmn1, gmn1*b*, gmn2*a* and gmn2*b* are respectively small-signal transconductances of correspondent N-type FETs Mn1*a*, Mn1*b*, Mn2*a* and Mn2*b*; gmp=gmp1*a*=gmp1*b*=gmp2*a*=gmp2*b*; gmp1*a*, gmp1*b*, gmp2*a* and gmp2*b* are respectively small-signal transconductances of correspondent P-type FETs Mp1*a*, Mp1*b*, Mp2*a* and Mp2*b*. As is known to one skilled in the art, the transconductance of the N-type FET is only slightly larger than that of the P-type FETs, i.e., gmn is slightly larger than gmp; thus the DC gain A1 is relatively small and the front-end receiver PRE_RCV has a low gain.

AC (alternating current) features: p1=gmp/C1, wherein C1 is an equivalent capacitance of the output port of the front-end receiver PRE_RCV; p1 is a pole of the output port of the front-end receiver PRE_RCV; as is known to the one skilled in the art, the transconductance gmp is relatively large and C1 is relatively small, which results in a relatively large pole p1, in such a manner that the front-end receiver PRE_RCV has a high bandwidth.

Because the first secondary amplifier SEC_APM1 and the second secondary amplifier SEC_AMP2 have the identical structures and the identical functions, only the first secondary amplifier SEC_APM1 is described herein.

The DC gain A2=(gm2*R)$^2$, wherein gm2=gm1*a*=gm1*b*=gm2*a*=gm2*b*=gm4*a*=gm4*b*=gm5*a*=gm5*b*; the gm1*a*, gm1*b*, gm2*a*, gm2*b*, gm4*a*, gm4*b*, gm5*a* and gm5*b* are respectively small-signal transconductances of the FETs M1*a*, M1*b*, M2*a*, M2*b*, M4*a*, M4*b*, M5*a* and M5*b*; and R represents resistances of the resistors R1, R2, R4, R5, R7, R8, R10 and R11, i.e., R=R1=R2=R4=R5=R7=R8=R10=R11. Practically, the value of R is relatively small and usually smaller than 5 KΩ, which means that the value of A2 cannot be too big, in such a manner that the first secondary amplifier SEC_APM1 has an intermediate gain.

AC feature: $p2=1(R*C2)$, wherein C2 is an equivalent capacitance of the output terminal of the first secondary amplifier SEC_APM1; p2 is a pole of the output terminal of the first secondary amplifier SEC_APM1. Because the values of R and C2 are relatively small, the value of the pole p2 is relatively large, which means that the first secondary amplifier SEC_APM1 has a high bandwidth. A pole of the output terminal of the second secondary amplifier SEC_APM2 is set as p3; because p2 coincides with p3, the whole secondary amplifier has a function of filtering and thus is able to rapidly attenuate noises having higher frequency than the signals.

Because the first secondary amplifier SEC_APM1 and the second secondary amplifier SEC_AMP2 have the identical structures and the identical functions, only the first secondary amplifier SEC_APM1 is described herein.

DC gain $A3=gm3*(ron//rop)$, wherein $gm3=gm3a=gm6a=gm6b$; $gm3a$, $gm3b$, $gm6a$ and $gm6b$ are respectively small-signal transconductances of the FETs M3a, M3b, M6a and M6b; rop is a small-signal resistance of the FETs Mp2 and Mp4; and ron is a small-signal resistance of the FETs M3b and M6b. Because ron and rop are relatively big and usually larger than 100 KΩ, the value of DC gain A3 is relatively big, in such a manner that the first secondary amplifier SEC_APM1 has a high gain.

AC feature: $p4=1/(C3*(ron//rop))$, wherein C3 is an equivalent capacitance of the output terminal of the first secondary amplifier SEC_APM1; p4 is a pole of the output terminal of the first secondary amplifier SEC_APM1. Because the values of ron and rop are relatively big, the value of the pole p4 is relatively small, in such a manner that the first secondary amplifier SEC_APM1 has a low bandwidth.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A differential signal detecting device, comprising:
a secondary amplifier;
a front-end receiver and a final amplifier which are respectively connected to said secondary amplifier;
and a signal outputter which is connected to the final amplifier;
wherein said front-end receiver is a receiver having a high bandwidth and a low gain, for simultaneously receiving externally inputted two channels of differential signals and an externally inputted reference threshold voltage, wherein said front-end receiver simultaneously amplifies said externally inputted two channels of differential signals and said externally inputted reference threshold voltage, processes the externally inputted two channels of differential signals with a differential transduction and then outputs said amplified two channels of differential signals and said amplified reference threshold voltage; said secondary amplifier is an amplifier having a high bandwidth and an intermediate gain, wherein said secondary amplifier receives and amplifies said reference threshold voltage and said two channels of differential signals which are outputted by said front-end receiver, and outputs said two channels of differential signals and said reference threshold voltage which are amplified again; said final amplifier is an amplifier having a low bandwidth and a high gain, wherein said final amplifier respectively differentiates and amplifies the reference threshold voltage which is outputted by said secondary amplifier and said two channels of differential signals which are outputted by said secondary amplifier; then said final amplifier outputs said two channels of differentiated signals; said signal outputter receives said two channels of differentiated signals which are outputted by said final amplifier, process said two channels of differentiated signals with a logical conjunction and outputs desired signals.

2. The differential signal detecting device, as recited in claim 1, wherein said front-end receiver has three input ports respectively for outputting said two channels of differential signals which are differentiated and amplified by said front-end receiver and said reference threshold voltage which is amplified by said front-end receiver.

3. The differential signal detecting device, as recited in claim 2, wherein said secondary amplifier comprises a first secondary amplifier and a second secondary amplifier which both have two input terminals and two output terminals.

4. The differential signal detecting device, as recited in claim 3, wherein said two input terminals of said first secondary amplifier are respectively connected to said two output ports of said front-end receiver; said two output terminals of said first secondary amplifier are connected to said final amplifier; said first secondary amplifier receives a first channel of differential signal and said reference threshold voltage which are outputted by said front-end receiver and simultaneously amplifies said received first channel of differential signal and said received reference threshold voltage which are further outputted into said final amplifier via said two input terminals of said first secondary amplifier.

5. The differential signal detecting device, as recited in claim 4, wherein said two input terminals of said second secondary amplifier are respectively connected to said two output ports of said front-end receiver; said two output terminals of said second secondary amplifier are connected to said final amplifier; said second secondary amplifier receives a second channel of differential signal and said reference threshold voltage which are outputted by said front-end receiver and simultaneously amplifies said received second channel of differential signal and said reference threshold voltage which are further outputted into said final amplifier via said two output terminals of said second secondary amplifier.

6. The differential signal detecting device, as recited in claim 4, wherein said first secondary amplifier comprises a first stage-one amplifier and a first stage-two amplifier which both have two input terminals and two output terminals; said two input terminals of said stage-one amplifier are connected to said two output ports of said front-end receiver; said two output terminals of said first stage-one amplifier are connected to said two input terminals of said first stage-two amplifier; said two output terminals of said first stage-two amplifier are connected to said final amplifier; and said first stage-one amplifier and said first stage-two amplifier successively amplify said first channel of differential signal and said reference threshold voltage which are outputted by said front-end receiver at two stages.

7. The differential signal detecting device, as recited in claim 5, wherein said second secondary amplifier comprises a second stage-one amplifier and a second stage-two amplifier which both have two input terminals and two output terminals; said two input terminals of said second stage-one amplifier are connected to said two output ports of said front-end receiver; said two output terminals of said second stage-one amplifier are connected to said two input terminals of said second secondary amplifier; said two output terminals of said second stage-two amplifier are connected to said final amplifier; said second stage-one amplifier and said second stage-two amplifier successively amplify said second channel of differential signal and said reference threshold voltage which are outputted by said front-end receiver at two stages.

8. The differential signal detecting device, as recited in claim 5, wherein said final amplifier comprises a first final amplifier and a second final amplifier which both have two input terminals and an output terminal; said two input terminals of said first final amplifier are connected to said two output terminals of said first secondary amplifier; said output terminal of said first final amplifier is connected to said signal outputter; said first final amplifier receives said differential signals and said reference threshold voltage which are outputted by said first secondary amplifier, differentiates and amplifies said received differential signals and said received reference threshold voltage and then outputs said first channel of differential signal; said two input terminals of said second final amplifier are connected to said two output terminals of said second secondary amplifier; said output terminal of said second final amplifier is connected to said signal outputter; said second final amplifier receives said differential signals and said reference threshold voltage which are outputted by said second secondary amplifier, differentiates and amplifies said received differential signals and said received reference threshold voltage and then outputs said second channel of differential signal.

9. The differential signal detecting device, as recited in claim 8, wherein said signal outputter is an AND gate circuit or an OR gate circuit; two input terminals of said AND gate circuit or said OR gate circuit are respectively connected to said output terminal of said first final amplifier and said output terminal of said second final amplifier.

* * * * *